United States Patent
Narayanaswamy et al.

(10) Patent No.: US 6,901,590 B2
(45) Date of Patent: May 31, 2005

(54) SYSTEM AND METHOD FOR SINGLE TRANSPARENT DEPLOYMENT FLOW

(75) Inventors: Sreedhara Srinivasulu Narayanaswamy, Plano, TX (US); Gerald L. Boyd, Trenton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/378,504

(22) Filed: Mar. 3, 2003

(65) Prior Publication Data

US 2004/0177358 A1 Sep. 9, 2004

(51) Int. Cl.$^7$ .............................................. G06F 9/445
(52) U.S. Cl. ........................ 717/177; 709/219; 709/203; 719/320
(58) Field of Search ................................ 717/168–178; 709/200–203, 217–219, 223–226, 310–320; 719/320

(56) References Cited

U.S. PATENT DOCUMENTS

| | | | | |
|---|---|---|---|---|
| 5,845,090 A | * | 12/1998 | Collins et al. | 709/221 |
| 5,860,012 A | * | 1/1999 | Luu | 717/175 |
| 6,064,813 A | * | 5/2000 | Sitbon et al. | 717/100 |
| 6,362,836 B1 | * | 3/2002 | Shaw et al. | 345/744 |
| 6,574,617 B1 | * | 6/2003 | Immerman et al. | 707/1 |
| 6,578,142 B1 | * | 6/2003 | Anderson et al. | 713/2 |
| 6,618,820 B1 | * | 9/2003 | Krum | 714/13 |

* cited by examiner

Primary Examiner—St. John Courtenay, III
(74) Attorney, Agent, or Firm—Cooper & Dunham LLP

(57) ABSTRACT

A system and method for assembling and deploying program units to application servers uses single transparent deployment flow (STDF) architecture to allow users to have a single deployment process deploying to an application server that may be installed across a plurality of platforms or a single platform. The STDF system and method of the present disclosure in one embodiment retrieves information relating to applications deployed, nodes, server or container information, and virtual hosts for web applications. The information is presented to a user for selection and the selected information is used to create a tool command language script for deploying to one or more desired application servers.

20 Claims, 3 Drawing Sheets

300

Deployment of Enterprise JavaBeans

This script deploys Enterprise Java Beans
set mynode jeda
set earfile /home/sns/websphere-models/DWSCOMPkgProject.ear
set sname "SNSMigrate"
set applname "SNSREMOTE1"

EnterpriseApp install /Node:$mynode/ $earfile -defappserver
/Node:$mynode/ApplicationServer:$sname/ -appname $applname -deploy
EnterpriseApp start /EnterpriseApp:$applname/

Redeployment of Enterprise JavaBeans set mynode cnx0addsn1
set earfile
"D:/CA/AdvantageJoe/output/JavaOnenewpkgProject/JavaOnenewpkgProject.ear"
set sname "Default Server"
set applname "Test3"

EnterpriseApp stop /EnterpriseApp:$applname/
EnterpriseApp remove /EnterpriseApp:$applname/
EnterpriseApp install /Node:$mynode/ $earfile -defappserver
/Node:$mynode/ApplicationServer:$sname/ -appname $applname
EnterpriseApp start /EnterpriseApp:$applname/

Figure 3

SYSTEM AND METHOD FOR SINGLE TRANSPARENT DEPLOYMENT FLOW

TECHNICAL FIELD

The present application relates to enterprise management systems, and particularly, to a system and method for deploying program components to a target server or platform in a single flow.

BACKGROUND

Middle tier applications, also referred to as application servers, typically operate on top of a wide range of existing enterprise systems such as database management systems, transaction monitors, and naming and directory services. Many of these application servers are built based on standard specifications such as the Java 2 Platform, Enterprise Edition (J2EE) to provide portability and scalability to applications managing and accessing various enterprise systems.

J2EE, for example, defines a specification for developing enterprise applications to follow as a standard. J2EE bases the enterprise applications on standardized, modular components, by providing a set of services to those components, and by handling many details of application behavior automatically. J2EE includes support for Enterprise JavaBeans (EJB) components, Java Servlets API, JavaServer Pages, and Extended Marked-up Language (XML) technology.

Accordingly, an application built conforming to the J2EE standard specification may be deployed to an application server that supports the J2EE standards, thus allowing the deployed application to manage and access various resources provided by the underlying enterprise systems via the application server. Briefly, deployment is the process of distributing and configuring various part of application programs such as J2EE applications to appropriate locations in application servers.

Although J2EE provides standard specifications for application servers and applications running on these application servers, each application must be deployed according to vendor or application server provider's specific criteria. In most cases, each vendor supplying the application server also provides deployment methods and tools for deploying applications to its application server specifically. These vendor provided tools frequently require users to perform multiple manual steps for assembling and deploying applications. For example, IBM Websphere provides Websphere Assembly Tool to assemble and manually generate the JNDI XMI files, and Websphere Admin Console for the actual deployment. Accordingly, what is needed is a system and method that allows users to deploy as well as redeploy program files to a target application server using a single flow of transaction.

SUMMARY

A system and method for automatically deploying program units in a single flow to an application server is provided. The method in one aspect dynamically retrieves information associated with an application server on which one or more program units can be deployed, and uses the retrieved information to generate a script file for deployment. The retrieved information may include whether an application has already been deployed, node names, container names, and the virtual host names.

In another aspect, the method allows deployment of program files to local and/or remote platforms where the application servers are installed. Yet in another aspect, the method allows redeployment of program files to the application servers, for example, stopping an application running on the target server and redeploying an updated application. Further yet, the method in one aspect automatically generates JNDI bindings to be included in a deployment descriptor.

A system for automatically deploying program units or files in a single flow, in one aspect, includes a deployment module that may be run on a computer processor. The deployment module retrieves information associated with an application server on which one or more program units or files can be deployed. The information may include whether an application has already been deployed, node names, container names, and virtual host names. A script file used for deployment is then automatically generated using the information.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 shows an example of a tcl script that deploys Enterprise Jave Beans to Websphere.

DETAILED DESCRIPTION

The present disclosure describes a system and method for assembling and deploying software or program units, also referred to as program files or program modules to a middle tier applications or application servers such as the IBM Websphere Single/Advanced Enterprise Application Server. EJBs to be deployed need not have been generated by a particular assembly tool provided in the target application server. The system and method in one aspect uses single transparent deployment flow (STDF) architecture to allow users to have a single deployment process when deploying to an application server.

The system and method, in one embodiment, may be implemented as a plug-in, for example, to be used in conjunction with a universal deployment tool such as the one described in the copending U.S. patent application Ser. No. 10/378,503 filed on Mar. 3, 2003, entitled "Universal Deployment Tool," which application is incorporated herein in its entirety by reference thereto. A user interface such as the one described in that application may be provided to guide a user through this single deployment process.

Assembling EJB components typically includes packaging classes into JAR (Java archive) and WAR (Web archive) files, creating EAR (EJB archive) file, and generating deployment descriptor files, among other tasks. When operated in conjunction with the deployment tool described in the U.S. patent application Ser. No. 10/378,503 or a similar tool, the STDF system and method of the present disclosure in one embodiment allows assembling of one or more EJBs, generating application server suitable deployment descriptors, and deploying the components to the application server such as the Websphere Single/Advanced Enterprise Edition Application Server in a single process flow.

In the following description, well-known functions and components are not described in detail. Thus, many known features and definitions related to J2EE standard specification and Java programming methods are not described in detail. Also in the following description, Websphere is used as an example of a target application server, however, it should be understood that the disclosed method and system may be used to deploy to other application servers having similar deployment schemes.

Figure 1:
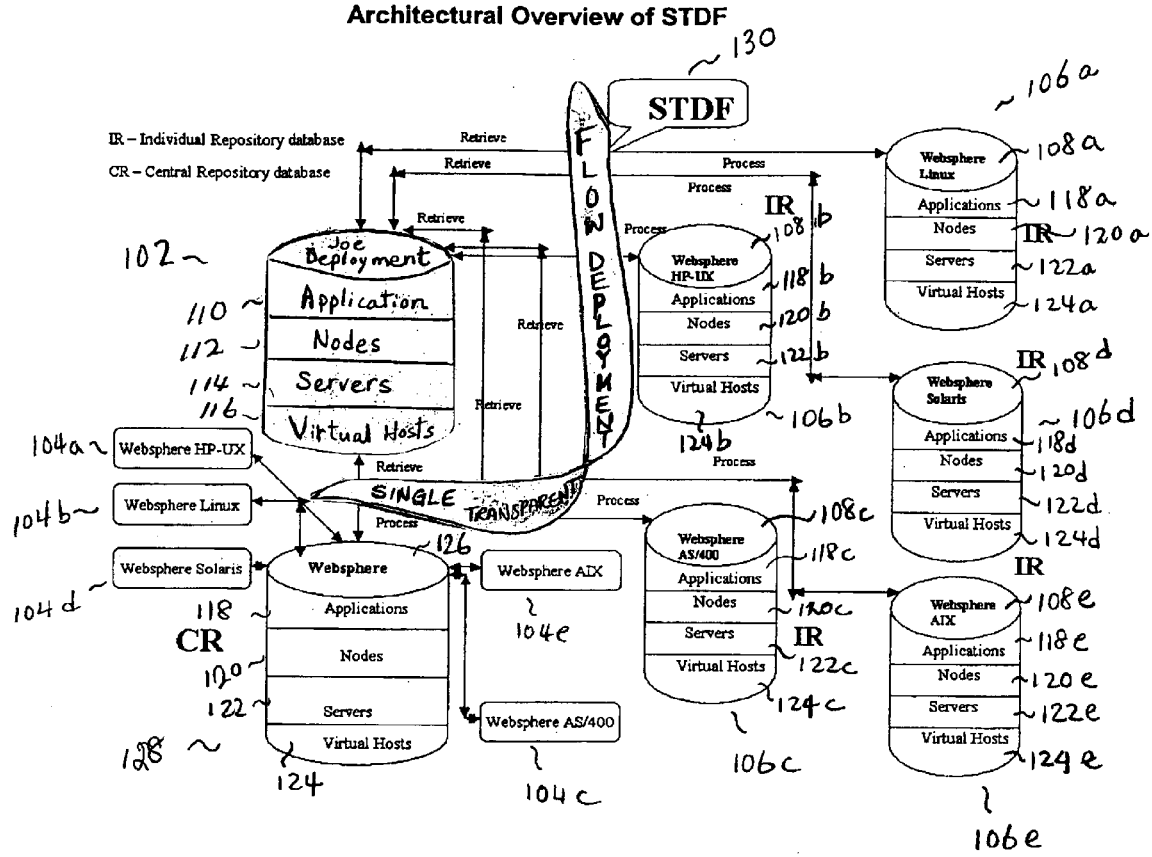
FIG. 1 is an architectural diagram illustrating the single transparent deployment flow in one embodiment.

FIG. 1 is an architectural diagram illustrating the single transparent deployment flow in one embodiment. An application server, for example, the Websphere Advanced Enterprise Edition may be installed using individual repository database 106a–106e or central database 104 such as DB2, Oracle, etc. In an individual repository scheme, a separate database 106a–106e is used to store the information model of application servers such as the Websphere. An information model may include such information as Enterprise JavaBean deployment information. An individual repository 106a–106e is identified as a single node for that application server installation. FIG. 1 shows the Websphere HP-UX 108b, Websphere Linux 108a, Websphere Solaris 108d, Websphere AIX 108e, and Websphere AS/400 108c using individual repositories 106a–106e, respectively, to store the information model. As shown, each server may have its own database.

In a central repository scheme, application server instances on different platforms, for example, Websphere HP-UX 104b, Websphere Linux 104a, Websphere Solaris 104d, Websphere AIX 104e, and Websphere AS/400 104c, use the same repository 128 to store the information model. The STDF 130 of the present disclosure retrieves information from an application server such as the Websphere, which may be installed according to an individual repository or central repository scheme. During the deployment to an application server such as the Websphere, the STDF 130 of the present disclosure retrieves information related to the application server from the existing repositories, central or individual. The retrieved information may include applications 110, for example, that are already deployed, nodes 112, available servers or containers 114, and virtual hosts 116 for web applications corresponding to the installed application servers 104a–e, 108a–e.

The repositories 128, 106a–e may be accessed remotely or locally. For example, STDF 130 may access a central repository 104, which may be located locally or remotely, to retrieve information about the application servers 104a–104e installed on different platforms that use the central repository 104 for storing their information models 118, 120, 122, 124. These application servers on different platforms 104a–104e may be located locally or remotely. Similarly, STDF 130 may access the individual repositories 106a–106e to retrieve the information such as individual nodes 120a–120e, applications deployed onto these individual application server nodes 118a–118e, container information of the application server instances 122a–122e, and virtual host information 124a–124e, corresponding to individual application servers 108a–108e installed on different platforms.

A user or a person performing the deployment then may be provided with a list of the information model from which to make a selection, or to supply new information such as a new application name. After the user selects a node 112, a new application or already existing application 110 for deployment or redeployment, server or container name 114, and virtual host 116, the STDF 130 uses this information to create a script, for example, a tool command language ("tcl") script to be used for deployment. As known to those skilled in the art, tcl is a portable command language that provides programming facilities using variables, procedures, conditionals, list-processing functions, and looping constructs. An example of a tcl script 300 that deploys or redeploys Enterprise Jave Beans to Websphere is shown in FIG. 3. As described, the STDF 130 process in one embodiment provides a single flow for retrieving the information model from the individual repository on local and remote platforms as well as from the central repository, which may be installed on remote platforms.

Figure 2:
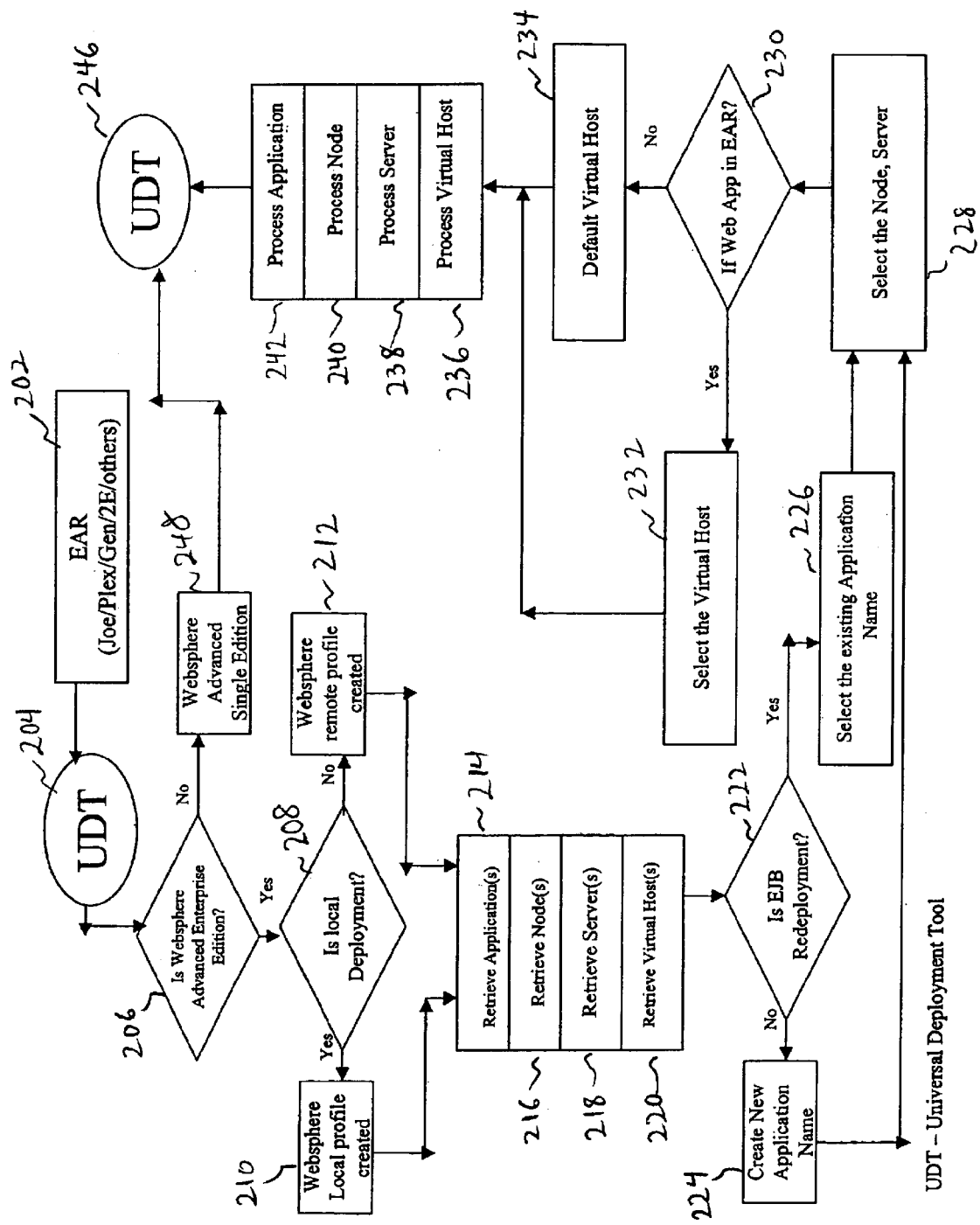
FIG. 2 is a functional diagram illustrating an overview of the single transparent deployment flow in one embodiment.

FIG. 2 is a functional diagram illustrating an overview of the single transparent deployment flow in one embodiment. An Enterprise Archive of the Enterprise JavaBeans (EAR) may include an Enterprise JavaBean and Web application, which may be generated and packaged using development environment tools such as the Advantage Joe, Advantage Gen, Advantage Plex, and Advantage 2E. The EAR file may then be accessed for deployment to an application server such as the Websphere Advanced Enterprise Edition. At 202, an EAR file is used as an input to a deployment tool such as the universal deployment tool that uses a plug-in architecture to deploy to particular application servers. Accordingly, the STDF process of the present disclosure may be implemented within a plug-in that supports deploying EJBs to an application server such as the Websphere Single and Advanced Enterprise Edition Application server.

At 204, the deployment process begins, in one embodiment, for example, using a deployment tool such as the universal deployment tool ("UDT"). At 206, a determination is made as to the version of the target application server, for example, whether the target application server is one that can be installed on a plurality of platforms or on a single platform. If at 206 it is determined that the target application server is, for example, an enterprise edition version, such as those that can be installed on multiple platforms such as the Websphere Advanced Enterprise Edition or another application server having a similar deployment scheme, at 208 a determination is made as to whether the deployment is to be local. If it is local deployment, at 210, Websphere local profile is created. Otherwise, if the deployment is to be remote, at 212, Websphere remote profile is created. The server profiles include, for example, profile name, EJB server host name, EJB server port number, user identifier (ID) and password, and deploy directory.

For remote deployment, the server profile additionally includes file transfer protocol ("ftp") user identifier ("id") and password. These data in the server profile are typically retrieved from the existing server profiles that were created previously and/or from user input during the deployment process.

At 214, one or more already deployed applications are retrieved from one or more local and/or remote application servers installed on different platforms. At 216, information about one or more nodes where each application servers are installed are retrieved. At 218, one or more containers for installing the EJBs and web applications are retrieved. At 220, information about one or more virtual hosts used by one or more installed application servers are retrieved.

At 222, it is determined whether a redeployment is to be performed. For example, a user may be prompted to answer a question as to whether an application is being newly deployed or redeployed. If an application is being redeployed, then at 226, an existing application name is selected. The existing application names, for example, may have been retrieved at step 214 from an EJB container in the target application server. Otherwise, if this is a new deployment, at 224, a new application name is created and the processing proceeds to 228.

At 228, a node and a server are selected. At 230, it is determined whether any web applications are in the EAR file. If yes, at 232, virtual host is selected, and the processing continues to 236. Otherwise, at 234, default virtual host is used.

At 236, the selected virtual host information is used to create a tcl file. At 238, the selected server information is used to create a tcl file. At 240, the selected node information is used to create a tcl file. At 242, the selected application information is used to create a tcl file. If the selected application is being redeployed, the tcl file may include instructions to stop the application if running in a container of the target application and remove the instances of the application before being redeployed.

In one aspect, the STDF of the present disclosure may be used to deploy to target application servers that do not support hot deployment. Hot deployment refers to a mechanism where an application server monitors a directory and deploys any new updates as the updates are made into that directory. Because, for example, the generated tcl script may include the instructions to deploy and redeploy the EJBs, the STDF of the present disclosure may be used to deploy and redeploy EJBs regardless of whether or not a target application server supports hot deployment.

The system and method in one aspect provides for automatic generation of the JNDI bindings. Without this automatic functionality, users may need to manually generate customized files such as the JNDI XMI (XML Metadata Interchange) files required by some application servers. Briefly, XMI is a proposed use of the Extensible Markup Language (XML) that is intended to provide a standard way for programmers and other users to exchange information about metadata, for example, information about what a set of data includes and how it is organized.

After the tcl scripts are generated using the information retrieved from one or more of application server platforms, the STDF of the present disclosure in one embodiment performs the JNDI bindings. For example, a final EJB.ear, which for IBM's Websphere uses IBM WSCP (Websphere Control Program) for deployment, may include the necessary JNDI binding files created by the STDF of the present disclosure. The tcl script file may then be passed into an application server's control program, for example WSCP, to perform the deployment or redeployment.

A final EJB.ear may include the following: webapplication.war; library/Component.jar; META-INF/sun-j2ee-ri.xml; META-INF/ibm-application-bnd.xmi; JavaOnenewpkg.jar; META-INF/MANIFEST.MF; META-INF/application.xml; META-INF/ibm-application-ext.mxi. The JavaOnenewpkg.jar contains in META-INF directory: META-INF/ejb-jar.xml; META-INF/ibm-ejb-jar-bnd.xmi; META-INF/ibm-ejb-jar-ext.xmi; META-INF/MANIFEST.MF.

In this example, the EJB.ear at the EAR level, includes the ibm-application-bnd.xmi file created by the STDF of the present disclosure. Each EJB jar level includes a corresponding ibm-ejbjar-bnd.xmi file also created by the STDF. These xmi files automate the JNDI bindings of the Enterprise JavaBeans, which are deployed to an application server such as the Websphere Advanced Enterprise Edition 4.0.3. Application server suitable deployment descriptors generated may, for example, include Java Naming and Directory Interface (JNDI) binding files.

The JNDI bindings may be performed as part of the deployment process, for example, using the universal deployment tool that uses a plug-in that implements the STDF process of the present disclosure. At 246, the processing continues with the universal deployment tool processing for deploying the application to an appropriate application server.

If, at 206, it is determined that the target application is a Websphere Advanced Single Edition 248 or a similar application server that is installed on a single platform, the processing continues at 246 with the deployment process. For example, this step may include allowing a user to modify deployment descriptors, packaging the EAR file and deploying to the desired application servers. A detailed description of UDT processing using plug-in architecture is described in more detail in the copending U.S. patent application Ser. No. 10/378,503, entitled "Universal Deployment Tool."

The system and method of the present invention may be implemented and run on a general-purpose computer. The embodiments described above are illustrative examples and it should not be construed that the present disclosure is limited to these particular embodiments. Various changes and modifications may be effected by one skilled in the art without departing from the spirit or scope of the invention as defined in the appended claims. For example, although the system and method disclosed herein has been described with respect to J2EE and Java environment, and Websphere application server as an example for ease of explanation, it is not limited only to such programming environment. Accordingly, the present invention is not limited except as by the appended claims.

We claim:

1. A method for automatically deploying program units in a single flow, comprising:

dynamically retrieving information associated with an application server on which one or more program units can be deployed;

using the retrieved information to generate a script file for automatically deploying the one or more program units, the script file including at least an instruction to stop running the one or more program units on the application server before deploying if the one or more program units are being redeployed and if previously installed one or more program units are running.

2. The method of claim 1, wherein the retrieving includes retrieving information related to one or more applications deployed on an application server.

3. The method of claim 1, wherein the retrieving includes determining one or more nodes on which the application server is installed.

4. The method of claim 1, wherein the retrieving includes retrieving information related to one or more server containers in which one or more applications can be deployed.

5. The method of claim 1, wherein the retrieving includes retrieving information related to one or more virtual hosts where one or more web application can be deployed.

6. The method of claim 1, further including determining whether an application server, to which the program units are being deployed, is installed on a plurality of platforms or on a single platform.

7. The method of claim 1, further including determining whether an application server uses a central repository or an individual repository for storing information related to the application server.

8. The method of claim 1, further including determining whether an application server is installed on one or more remote platforms; and if the application server is installed on one or more remote platforms, allowing deployment remotely to the application server installed on the one or more remote platforms.

9. The method of claim 1, further including determining whether an application is to be redeployed on the application server; and if the application is to be redeployed, allowing a user to select an existing application name for redeployment.

10. A program storage device readable by machine, tangibly embodying a program of instructions executable by the machine to perform method steps of automatically deploying program units in a single flow, comprising:
   dynamically retrieving information associated with an application server on which one or more program units can be deployed;
   using the retrieved information to generate a script file for automatically deploying the one or more program units, the script file including at least an instruction to stop running the one or more program units on the application server before deploying if the one or more program units are being redeployed and if previously installed one or more program units are running.

11. The program storage device of claim 10, wherein the retrieving includes retrieving information related to one or more applications deployed on an application server.

12. The program storage device of claim 10, wherein the retrieving includes determining one or more nodes on which the application server is installed.

13. The program storage device of claim 10, wherein the retrieving includes retrieving information related to one or more server containers in which one or more applications can be deployed.

14. The program storage device of claim 10, wherein the retrieving includes retrieving information related to one or more virtual hosts where one or more web application can be deployed.

15. The program storage device of claim 10, further including determining whether an application server, to which the program units are being deployed, is installed on a plurality of platforms or on a single platform.

16. The program storage device of claim 10, further including determining whether an application server uses a central repository or an individual repository for storing information related to the application server.

17. The program storage device of claim 10, further including determining whether an application server is installed on one or more remote platforms; and if the application server is installed on one or more remote platforms, allowing deployment remotely to the application server installed on the one or more remote platforms.

18. The program storage device of claim 10, further including determining whether an application is to be redeployed on the application server; and if the application is to be redeployed, including instructions in the script file to remove the application from the application server.

19. A system for automatically deploying program units in a single flow, comprising:
   a deployment module operable to run on a computer processor to retrieve information associated with an application server on which one or more program units can be deployed, and to use the retrieved information to generate a script file for automatically deploying the one or more program units, the script file including at least an instruction to stop running the one or more program units on the application server before deploying if the one or more program units are being redeployed and if previously installed one or more program units are running.

20. The system of claim 19, wherein the deployment module is further operable to transmit the information to a user and receive user input related to the information, wherein the script file for deployment includes received user input.

* * * * *